United States Patent [19]

Merritt

[11] Patent Number: 4,903,499
[45] Date of Patent: Feb. 27, 1990

[54] REFRIGERANT RECOVERY SYSTEM

[75] Inventor: Thomas D. Merritt, Miami, Fla.

[73] Assignee: High Frequency Products, Inc., Miami, Fla.

[21] Appl. No.: 255,960

[22] Filed: Oct. 11, 1988

Related U.S. Application Data

[63] Continuation-in-part of Ser. No. 141,811, Jan. 11, 1988, abandoned, and a continuation-in-part of Ser. No. 182,528, Apr. 18, 1988, abandoned.

[51] Int. Cl.⁴ .............................................. F25B 45/00
[52] U.S. Cl. ......................................... 62/149; 62/77; 62/195; 62/292
[58] Field of Search ................... 62/77, 84, 85, 149, 62/174, 195, 292, 470, 474, 475

[56] References Cited

U.S. PATENT DOCUMENTS

| | | | |
|---|---|---|---|
| 3,232,070 | 2/1966 | Sparano | 62/292 X |
| 3,664,147 | 5/1972 | Blackmon | 62/85 |
| 4,285,206 | 8/1981 | Koser | 62/292 X |
| 4,441,330 | 4/1984 | Lower et al. | 62/292 X |
| 4,476,688 | 10/1984 | Goddard | 62/292 X |
| 4,539,817 | 9/1985 | Staggs et al. | 62/292 X |
| 4,646,527 | 3/1987 | Taylor | 62/292 X |

Primary Examiner—Harry B. Tanner
Attorney, Agent, or Firm—Melvin K. Silverman

[57] ABSTRACT

A system for refrigerant and recovery and processing includes a hollow fluid-tight pressure vessel having a fluid input; a hollow annular jacket having its inner surface in thermal communication with the pressure vessel, the jacket having a polar axis in substantial alignment with the gravity vector, and the jacket having a liquid accumulator at the bottom thereof. The jacket is provided with an input in liquid communication with the refrigeration system to be vented during a recovery process, such input line in fluid communication with the pressure vessel during reprocessing of the refrigerant. The input from the refrigerant line is further provided with a liquid expansion element for selectively increasing the volume of fluid flowing from the vessel, or from the refrigerant system to be vented. A condenser is in fluid communication with the output of the pressure vessel. Resultingly, the temperature of the vessel will be lowered by virtue of its thermal communication with the jacket, enhancing the efficiency of the condenser and, consequently, of the processing system.

8 Claims, 2 Drawing Sheets

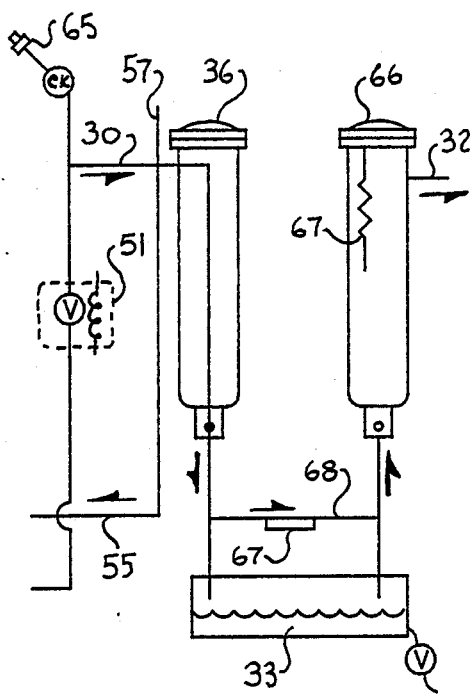
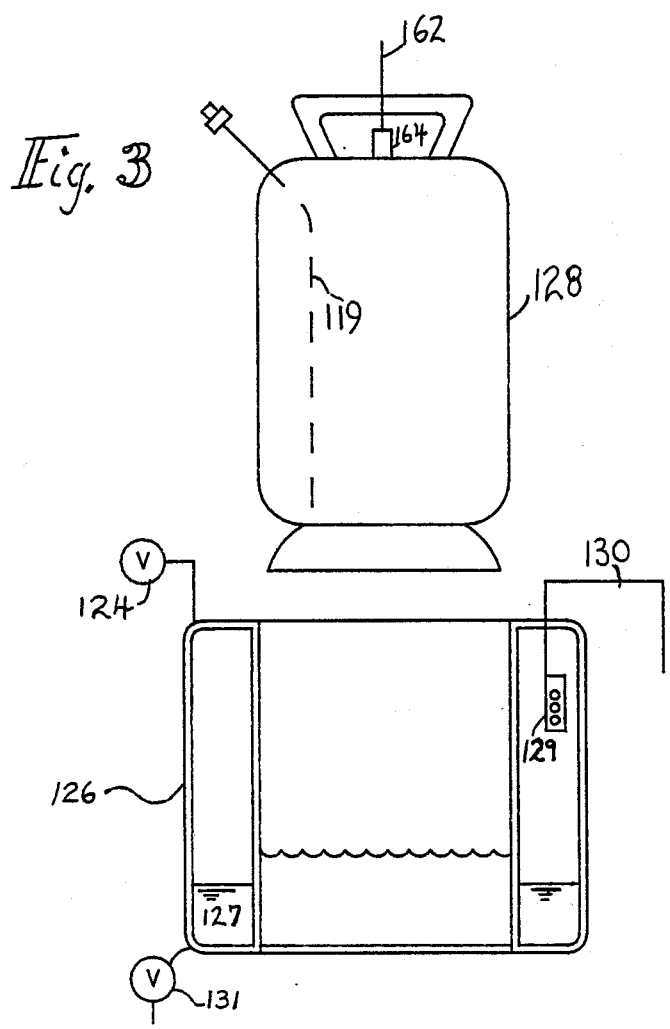
Fig. 2
Fig. 3

REFRIGERANT RECOVERY SYSTEM

REFERENCE TO RELATED APPLICATION

This is a continuation-in-part of application Ser. No. 141,811, filed Jan. 11, 1988 now abandoned, entitled Refrigerant Recovery System and of application Ser. No. 182,528 now abandoned, filed Apr. 18, 1988, entitled Refrigerant Recovery System.

BACKGROUND OF THE INVENTION

In recent years a considerable concern regarding the status of the ozone layer, which surrounds the earth at an altitude in the range of six to thirty miles, has developed. More particularly, scientists have estimated that as much as seven percent of the so-called ozone belt has already been destroyed. Moreover, researchers have found evidence of "holes" in the ozone layer, including one over the Antarctica having an area of more than a million square miles.

The consequences of this deterioration of the world's ozone layer can, it is believed, lead to a dramatic increase in skin cancer and cataracts, this including a lowered resistance of all organisms on the planet to infection. From this impact upon plant-life, which is believed to be probable, damage to the food chain would also occur. In addition, it is believed that with further thinning of the ozone layer, a general warming trend of the earth will occur, this leading to a possibly disastrous rise in sea-levels.

As a result of a near universal recognition of the above threat to human and other life, at a United Nations Conference, twenty-four countries have signed an agreement requiring that the production of ozone-destroying chemicals be reduced at least in half by the year 1999. These ozone destroying chemicals are, particularly, man-made compounds known as chlorofluorocarbons (CFC's).

In simple terms, the protection of the ozone layer against further deterioration is basically a two-fold matter, namely, that of the reduction of production of CFC's, and, secondly, the control of the release of CFC's into the atmosphere.

At present, it is believed that most CFC's are released into the atmosphere as a result of carelessness when such items as refrigerators and air conditioning systems are permitted to release their CFC's (many of which are sold under the brand name FREON). Accordingly, an important aspect of the protection of the ozone layer from further decay is a matter of training mechanics and technicians working in the refrigeration and air conditioning field regarding how to prevent the escape of FREON and related materials from the equipment with which they work. Further, it is necessary to provide such mechanics and technicians with equipment particularly adapted to capture, in a simple and economic fashion, FREON and other CFC's which would otherwise be likely to escape in the course of repair or replacement of refrigeration and air conditioning equipment.

The present invention addresses the above problem of CFC/Freon recovery from air conditioning and refrigeration system in the course of repair or replacement of such systems.

Relavant prior art known to the inventor comprises U.S. Pat. No. 4,285,206 (1981) to Koser; No. 4,476,688 (1984) to Goddard; No. 4,539,817 (1985) to Staggs; and U.S. Pat. No. 4,646,527 to Taylor (1987). This art, suffers from shortcomings of efficiency, economy and convenience of use, all of which difficulties are solved by the instant invention.

SUMMARY OF THE INVENTION

The invention is a system for refrigerant recovery and purification. It includes a hollow fluid-tight pressure vessel having fluid input means; and a hollow, annular jacket having its exterior inner surface in thermal communication with said pressure vessel, said jacket having a polar axis in substantial alignment with the gravity vector, said jacket having liquid accumulation means at the bottom thereof, said jacket further having fluid output means. Also provided is fluid communication means for defining a fluid path, external of said vessel, between said vessel and an input to said jacket, said fluid communication means further comprising expansion valve means for selectively increasing the volume of fluid flowing from said vessel prior to its entry into said jacket. Condensing means are in fluid communication with said output means, said condensing means having an output in fluid communication with said input means of said pressure vessel, whereby the temperature of said vessel will be lowered by virtue of its thermal communication with said jacket, thereby enhancing the efficiency of said condensing means and, consequently, of the entire system.

It is an object of the present invention to provide a method and means for the recovery of refrigerants from a refrigeration system when that refrigeration system is being repaired or replaced.

It is another object to provide a method which will prevent escape of harmful CFC's into the atmosphere while effecting an economic benefit.

The above and yet other objects and advantages of the present invention will become apparent from the hereinafter set forth Detailed Description of the Invention, the Drawings, and the Claims appended herewith.

BRIEF DESCRIPTION OF THE DRAWINGS

FIG. 2 is an enlarged area of the view of FIG. 1 with specific reference to the condensing means and heating means.

FIG. 3 is a schematic view of an alternate embodiment of the pressure vessel and jacket means.

DETAILED DESCRIPTION OF THE INVENTION

Figure 1:
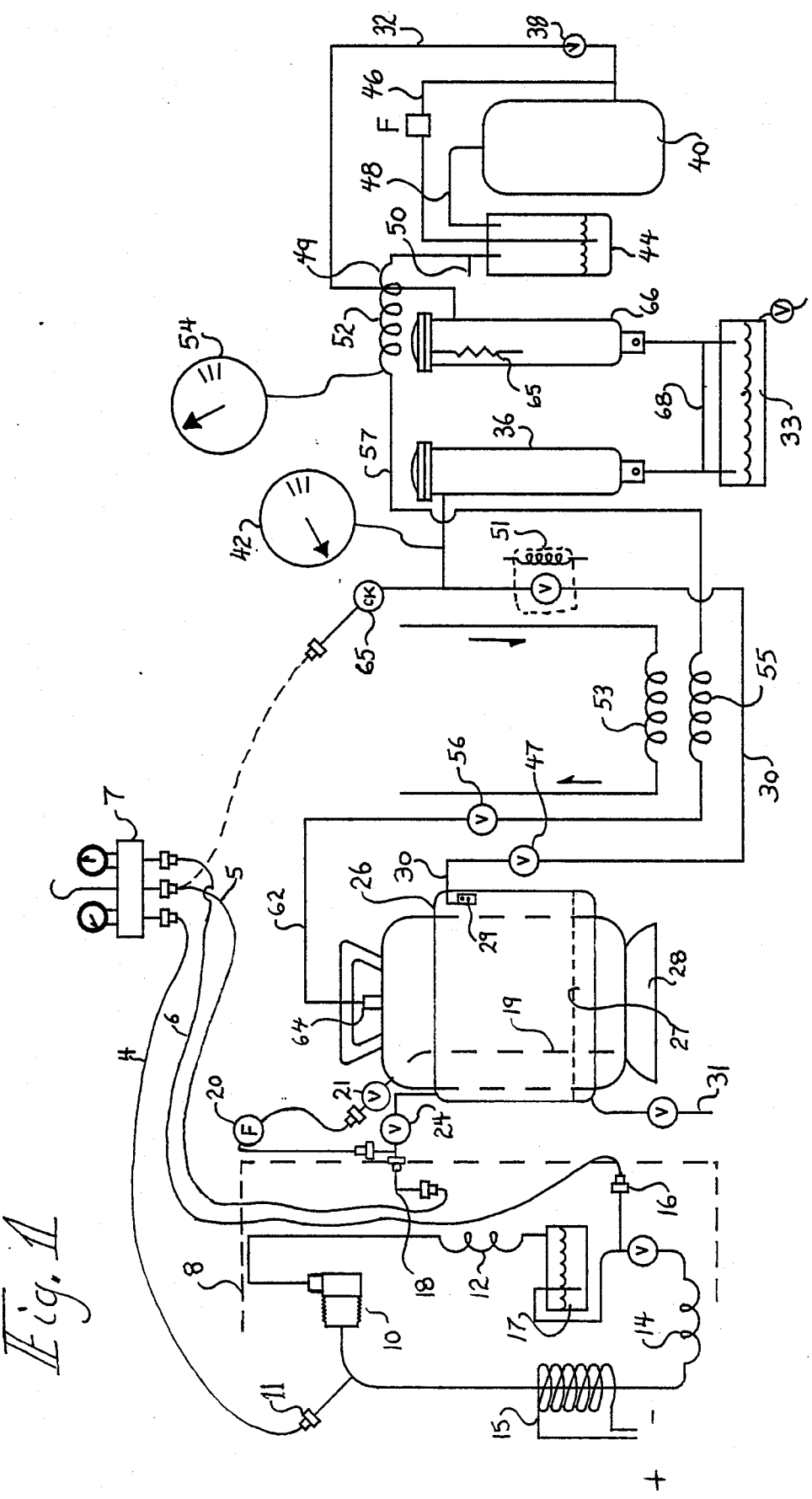
FIG. 1 is a schematic view of the present inventive refrigerant recovery system.

With reference to FIG. 1, there is shown, to the left of the figure, the system 8 to be evacuated. This system includes a compressor 10, a condenser 12, an evaporator 14, a liquid line service valve 16 and a liquid receiver 17.

The interface or tap between the present inventive refrigerant recovery device and the system 8 uses manifold gauges. A center hose S is attached at a high pressure liquid refrigerant line.

The low pressure hose of manifold gauges 7 connects to a suction service valve 11. A high pressure hose 6 of manifold gauges 7 connects to said liquid service valve 16.

This method of connection is useful when large amounts of liquid refrigerant are present within the system being evacuated.

An alternate method of connection places the low pressure hose 4 of manifold gauges 7 at suction service valve 11 while the high pressure hose of gauges 7 connects to service valve 16 and the center hose connects to valve 65. This method is useful in the automotive area where only vapor is generally available for recovery.

Following the first method of connection described above, a high pressure liquid refrigerant line connection 18 carries liquid refrigerant from the evacuated system 8 to a metering device 24. The function of the metering device is to controllably permit an expansion of the refrigerant liquid thereby creating a pressure differential between the high pressure liquid refrigerant line 18 and the inside of annular jacket 26 at a substantially lower pressure. For example, the pressure within high pressure liquid refrigerant line 18 will, at conditions of 90 degrees Fahrenheit and R12 refrigerant, be 90 psi while the conditions within annular jacket 26 will be about 20 pounds per square inch.

Annular jacket 26 surrounds special purpose storage bottle 28 which is provided with a valve-operated drain 31.

Within said jacket 26 there is formed a so called puddle 27 of refrigerant. This puddle will form within jacket 26 when a sufficient volume of low pressure gas accumulates therewithin. From puddle 27, which is technically known as a flooding evaporator, refrigerant will be drawn through a perforated suction tube 29. Liquid refrigerant, from the end of said tube 29, will be drawn from puddle 27 while the perforations therewithin will draw gas from the portion of said jacket above said puddle 27. Accordingly, a combination of both liquid and vapor refrigerant will enter a low pressure suction line 30. This combination of fluid may be considered a boiling liquid, and its condition as between a liquid or vapor will be determined by various system variables.

From low pressure suction line 30, the boiling liquid refrigerant travels to the right, passing a low pressure gauge 47. Therefrom (see FIG. 2 for enlarged view) refrigerant enters suction dryer means 36. Suction dryer means 36 performs the functions, of, filtering and drying.

As may be noted in FIG. 2, low pressure suction line 30 is in fluid communication with suction dryer means 36 and refrigerant exits at connection line 68. Below connection line 68 is shown an oil trap 33, the function of which is to remove oil from the boiling liquid refrigerant. This oil trap exists for the purpose of protecting the compressor 40 from the introduction of oils, moisture, or any other contaminants, from the system being evacuated.

It should be appreciated that the combination of jacket means 26, the suction line 30 and said dryer means 36, constitutes a segmented evaporator in which the superheat therein is controlled by either (1) an automatic expansion valve responding to compressor capacity, (2) a thermostatic expansion valve responding to a bulb positioned at point 67, or (3) any other known metering device.

From connection line 68, the refrigerant enters suction dryer 66, having a heat strip 65, which performs the function of a second dryer, and further protects compressor 40 from liquid refrigerant entering thereto. Said heat strip 65 is controlled by a temperature sensor on line 32. Accordingly, the refrigerant, upon exiting from 66 is assured to be in the vapor state. Therefrom, gaseous refrigerant travels through low pressure vapor suction line 32 and passes point 38 which is the connecting point for a low pressure control switch, the function of which is to turn off the entire system, including compressor 40, in the event of zero pressure.

At compressor 40 the low pressure vapor refrigerant is compressed in order to create a high pressure gaseous refrigerant output which passes through high pressure hot vapor line 48. This line then travels to oil separator 44, the function of which is to assure that compressor 40 is at all times supplied with oil. This is affected through oil return line 46 which connects oil separator 44 to low pressure suction line 32.

From oil separator 44, the high pressure gaseous refrigerant passes through high pressure hot vapor extension line 49 into air cooled condenser 52 which functions to reduce the temperature of the refrigerant passing by high pressure gauge 54. The refrigerant then passes from air cooled condenser 52 to a reduced temperature high pressure line 57.

From lines 57, condensed refrigerant enters high pressure water cooled refrigerant line 55, where further cooling is achieved by water cooled condenser 53 bringing the refrigerant into a liquid state. In operating water cooled condenser 53, tap water is used which, in certain areas of the country may be as warm as 70 degrees. In other areas it may be about 60 degrees.

Upon exiting the water cooled condenser 53, the liquified refrigerant passes through high pressure liquid line 62 into one way valve 56. The one way valve prevents refrigerant from flowing back from the special bottle 28 into the system when bottle pressure is higher than the system pressure. Further, it allows the refrigerant to flow into the bottle when the system pressure is higher than the bottle pressure.

From one way valve 56 the liquid refrigerant flows through high pressure liquid line 62 and into bottle access valve 64 where storage of the recycled, recovered refrigerant is effected.

It is to be appreciated that one of the functions of jacket 26 is to maintain bottle 28 at a low temperature to thereby enhance the overall efficiency of the system.

It is to be appreciated that in this system, three separate condensing mediums, namely, gas, air and water are used. This is especially important in adapting the system to use in the automotive industry where mainly gas vapor is being removed rather than liquid refrigerant. It has been found when removing refrigerant in vapor form freeze ups occur. By lowering the pressures in the evacuated system refrigerant tends to liquify and an ice bank will occur. To combat this occurrence, auxiliary heating pad 15 is wrapped around the suction accumulator 17 or any other available iced-up area.

Recovered refrigerant must strictly comply with the standards of the Society of Automotive Engineers, and other industrial bodies, before being reintroduced into systems under warranty by the industry. It is there for another function of this device to recycle recovered refrigerant in a constant refrigeration circuit, passing the recovered refrigerant many times through the distilling, filtering and drying means of the circuit.

The above can be accomplished, independent of any recovery, by including liquid line 19 filter 20 and solenoid valve 51 into the circuit. Also provided is refrigerant hand valve 21.

When solenoid valve 51 is energized and hand valve 21 is opened, a complete refrigerant circuit independent of the purged system 8 exists, drawing liquid refrigerant out of the storage bottle 28, through liquid line 19 containing filter 20, to connection point 18, through metering device 24, into jacket 26, and continuing on through the system as many times as is desired to achieve a desired degree of purity of the refrigerant, this continuing on, through the cycle, as long as solenoid valve 51 is energized. When valve 51 is de-energized the system pumps down and shuts off automatically, returning the refrigerant to the storage bottle.

Shown in FIG. 3 is an alternate embodiment of the invention in which jacket 26 is replaced by separate regions 126 which function in the manner of said jacket 26.

While there has been herein shown and described the preferred embodiments of the instant invention, it is to be understood that said invention may be embodied, otherwise than is herein illustrated and described and that within said embodiment, certain changes in the details of construction, and in the form and arrangement of the parts, may be made without departing from underlying idea or principles of this invention within the scope of the appended claims.

I claim:

1. A system for refrigerant recovery, re-cycling, purification and re-charging, the system comprising:
    (a) a hollow fluid-type pressure vessel having fluid input means and fluid output means;
    (b) a hollow, annular jacket having a surface thereof in thermal communication with said pressure vessel, said annular jacket having an axis in substantial alignment with the gravity vector, said jacket having, at the bottom thereof, liquid accumulation means, said jacket further including fluid input and output means;
    (c) fluid communication means for defining a fluid path for refrigerant purification, said path starting internally of said pressure vessel, passing through said vessel, through said fluid output means thereof, continuing externally of said vessel, and extending between said vessel and said input means of said jacket;
    (d) before said input means of said jacket, expansion means for selectively changing the volume of fluid flowing from said vessel prior to its entry into said jacket; and
    (e) condensing means in fluid communication with said output of said annular jacket, said condensing means itself having an output in fluid communication with said input means of said pressure vessel, whereby the temperature gradient between said vessel and said jacket may be controlled by reason of the thermal communication between said vessel and said jacket, thereby enhancing the efficiency of refrigerant purification of the system.

2. The system as recited in claim 1 in which said liquid accumulation means of said jacket further comprises:
    drain means for the periodic removal of containments from processed refrigerant.

3. The system as recited in claim 1, further comprising:
    in fluid communication with said expansion means a fluid interface with a refrigeration system to be vented of refrigerant, said interface including means for tapping refrigerant from, or re-charging refrigerant into, the system to be vented, said system to be vented having a reference level of pressure therein.

4. The system as recited in claim 3, in which said condensing means comprises:
    compressing means for elevating refrigerant in the system to a state having a higher pressure than the reference level of pressure within said system to be vented.

5. The system as recited in claim 3, further comprising:
    conduit means having therein a higher pressure than said reference level of pressure within said system to be vented, said conduit means having fluid communication with said pressure vessel, said conduit means located downstream of said condensing means, said conduit means providing subcooling of said refrigerant and assisting in the liquification of the refrigerant prior to its entry into said pressure vessel,
    whereby said annular jacket will maintain recovered refrigerant at a suitable low pressure, thereby yet further enhancing the efficiency of the system.

6. The system as recited in claim 4 in which said expansion valve means comprises:
    metering means.

7. The system as recited in claim 4, further comprising:
    water cooling means in thermal communication with said conduit means prior to its entry into said storage tank,
    whereby the temperature of the refrigerant is thereby lowered to achieve a liquid state prior to its entry into said pressure vessel.

8. The system as recited in claim 4 in which said condensing means comprises:
    refrigerant drying means and an oil separator.

* * * * *